US012611997B2

(12) United States Patent
He et al.

(10) Patent No.: US 12,611,997 B2
(45) Date of Patent: Apr. 28, 2026

(54) LAMINATED GLASS MOUNTED WITH CAMERA

(71) Applicant: FUYAO GLASS INDUSTRY GROUP CO., LTD., Fujian (CN)

(72) Inventors: Changlong He, Fuqing (CN); Feng Cai, Fuqing (CN); Xiong Li, Fuqing (CN); Jianming Zhang, Fuqing (CN); Jinliang Guan, Fuqing (CN)

(73) Assignee: FUYAO GLASS INDUSTRY GROUP CO., LTD., Fuqing (CN)

( * ) Notice: Subject to any disclaimer, the term of this patent is extended or adjusted under 35 U.S.C. 154(b) by 207 days.

(21) Appl. No.: 18/122,270

(22) Filed: Mar. 16, 2023

(65) Prior Publication Data

US 2023/0226987 A1 Jul. 20, 2023

Related U.S. Application Data

(63) Continuation of application No. PCT/CN2021/129046, filed on Nov. 5, 2021.

(30) Foreign Application Priority Data

Sep. 28, 2020 (CN) .......................... 202011039082.2

(51) Int. Cl.
*B60R 11/04* (2006.01)
*B32B 7/12* (2006.01)
(Continued)

(52) U.S. Cl.
CPC ................ *B60R 11/04* (2013.01); *B32B 7/12* (2013.01); *B32B 17/10064* (2013.01);
(Continued)

(58) Field of Classification Search
None
See application file for complete search history.

(56) References Cited

U.S. PATENT DOCUMENTS

2011/0052886 A1     3/2011   De Salins et al.
2011/0233248 A1*    9/2011   Flemming ............... B60R 11/02
                                                                          224/482
(Continued)

FOREIGN PATENT DOCUMENTS

CN         103502368 A     1/2014
CN         203818676 U     9/2014
(Continued)

OTHER PUBLICATIONS

JP 2018-508379 A machine translation (Year: 2018).*
(Continued)

*Primary Examiner* — Frank J Vineis
*Assistant Examiner* — Nicole T Gugliotta
(74) *Attorney, Agent, or Firm* — Scully, Scott, Murphy & Presser, P.C.

(57) ABSTRACT

A laminated glass mounted with a camera is provided. The laminated glass includes an external glass panel, an internal glass panel, and an intermediate bonding layer. A bracket is fixed to a fourth surface of the laminated glass. The camera is mounted on the bracket. An opaque resin layer is further disposed between the fourth surface and the bracket. The opaque resin layer has a visible light transmittance less than or equal to 3%. For each of the first surface, the second surface, the third surface, and the fourth surface of the laminated glass, no dark ceramic ink layer is disposed in a region which surrounds each optical transmitting window and has a periphery at least 10 mm away from a periphery of said each optical transmitting window.

17 Claims, 4 Drawing Sheets

(51) Int. Cl.

| | |
|---|---|
| *B32B 17/10* | (2006.01) |
| *B32B 27/08* | (2006.01) |
| *B60J 1/00* | (2006.01) |
| *B60J 1/02* | (2006.01) |
| *B60R 11/00* | (2006.01) |
| *B60R 11/02* | (2006.01) |
| *C03C 17/00* | (2006.01) |
| *C03C 17/36* | (2006.01) |
| *C03C 17/42* | (2006.01) |

(52) U.S. Cl.

CPC .............. *B60J 1/02* (2013.01); *C03C 17/002* (2013.01); *C03C 17/42* (2013.01); *B32B 17/10743* (2013.01); *B32B 17/10752* (2013.01); *B32B 17/1077* (2013.01); *B32B 17/10779* (2013.01); *B32B 17/10788* (2013.01); *B32B 2255/20* (2013.01); *B32B 2255/205* (2013.01); *B32B 2307/41* (2013.01); *B32B 2307/7376* (2023.05); *B32B 2605/00* (2013.01); *B60R 2011/0026* (2013.01); *C03C 2218/119* (2013.01)

(56) References Cited

U.S. PATENT DOCUMENTS

2013/0314540 A1* 11/2013 Hacker .................... B60J 1/002
348/148

2017/0232713 A1* 8/2017 Mannheim Astete ......................
B32B 17/10788
428/172
2017/0241195 A1* 8/2017 Ota ..................... B32B 17/1066
2019/0002338 A1* 1/2019 Furuhashi .............. C03C 17/04
2022/0024282 A1* 1/2022 Chiba ..................... B60J 1/001

FOREIGN PATENT DOCUMENTS

| CN | 104507697 A | 4/2015 | |
|---|---|---|---|
| CN | 110382227 A | 10/2019 | |
| CN | 111372773 A | 7/2020 | |
| CN | 111372774 A | 7/2020 | |
| CN | 111409314 A | 7/2020 | |
| CN | 111655480 A | 9/2020 | |
| JP | 2018508379 A * | 3/2018 | ............... B60J 1/00 |
| JP | WO2019012962 A1 | 1/2019 | |
| WO | WO-2019147605 A1 * | 8/2019 | .............. B32B 1/00 |
| WO | 2020116586 A1 | 6/2020 | |

OTHER PUBLICATIONS

International Search Report dated Jan. 27, 2022 issued in PCT/CN2021/129046.
First Chinese Office Action dated Sep. 24, 2021 issued in CN 202011039082.2.
Second Chinese Office Action dated Feb. 28, 2022 issued in CN 202011039082.2.

* cited by examiner

LAMINATED GLASS MOUNTED WITH CAMERA

This application is a continuation of International Application No. PCT/CN2021/129046, filed Nov. 5, 2021, which claims priority to Chinese Patent Application No. 202011039082.2 filed Sep. 28, 2020, the entire disclosure of which are incorporated herein by reference.

TECHNICAL FIELD

This disclosure relates to the field of glass product technology, in particular to a vehicle glass mounted at an opening of a vehicle body, and specifically a laminated glass mounted with a camera is provided.

BACKGROUND

With popularization of intelligent vehicle technologies such as assisted driving, automatic driving, etc., demands for the number of cameras have also developed from only one camera to two, three, or even more cameras, and requirements for shooting sharpness of cameras have also been greatly improved. For a front camera module (FCM) mounted on a vehicle windshield, the camera needs to obtain a real-time view of a vehicle in a driving direction through the vehicle windshield, which has higher requirements for a visible light transmittance, a diopter, and a curvature radius of an optical transmission region on the vehicle windshield through which the camera observes the outside of the vehicle.

In general, most vehicle windshields are printed with black ceramic inks in appearance to form masking at peripheries of the vehicle windshields, which has two following main functions. First, a rubber seal strip at a periphery of the vehicle windshield can be covered by a masking formed by a ceramic ink, which blocks direct sunlight on the rubber seal strip, so as to prevent the rubber seal strip from being damaged due to aging caused by frequent direct ultraviolet lights of sunlight. Second, an overall aesthetics can be ensured from an external view, and various accessories on an internal surface of the vehicle windshield and a trace of the rubber seal strip can be blocked.

According to existing cameras, most of optical transmission regions on vehicle windshields are required to have diopters (maximum allowable optical distortion value) less than 400 mdpt, and some high-end models are required to have diopters not greater than 200 mdpt. However, with continuous upgrading of intelligence, automation, and safety of the vehicle, quality, sharpness, and accuracy of an image obtained by the camera are required to be higher and higher, and even a sensor such as a laser radar is integrated, which requires that a diopter of a camera region shall not be greater than 150 mdpt, or even 100 mdpt. For the vehicle windshield mounted with the camera, the ceramic ink is printed and extends to a region where a bracket of the camera is mounted, and surrounds a periphery of the optical transmission region, and no ceramic ink is printed on the optical transmission region. However, the vehicle windshield needs to be treated at a high temperature and bending-and-molding during production, such as being heated to greater than 600° C. A glass substrate is heated mainly by heat radiation through a heating element in a heating furnace. An absorption capacity of the ceramic ink to thermal radiation is obviously different from an absorption capacity of the glass substrate to thermal radiation, especially the glass substrate is often provided with a transparent nano-film which is able to reflect thermal radiation, such as a transparent conducting film, an infrared reflecting film, etc., such that a temperature of a region printed with the ceramic ink is higher than a temperature of a region without ceramic ink. Therefore, a temperature gradient of tens of degrees Celsius is formed between different parts of the glass substrate, resulting in a dynamic difference of bending-and-molding of the glass substrate, such that optical distortion or light distortion occurs around a boundary between the region printed with the ceramic ink and the region without the ceramic ink, and is relatively obvious within 30 mm around the boundary. In order to avoid image glare, image blur, and other abnormalities caused by excessive natural lights and stray lights (stray lights reflected from an instrument panel, etc.) entering an optical path system of the camera, a distance between a boundary of the ceramic ink and the optical transmission region is relatively small, such that the diopter of the optical transmission region surrounded by the ceramic ink may be greater than 400 mdpt. As a result, the image obtained by the camera through the optical transmission region is unable to meet the requirements in quality, sharpness, and accuracy.

In order to solve a problem of optical distortion or light distortion around the boundary between the region printed with the ceramic ink and the region without the ceramic ink on the glass substrate, Chinese Patent Application No. 201280018141.5, Chinese Patent Application No. 201380040121.2, and US20110052886A1 disclose a polyvinyl butyral (PVB) printing technology, which prints a black pigment for shielding on PVB for a laminated glass to replace the ceramic ink printed on the glass substrate, thereby eliminating the temperature gradient formed between different parts of the glass substrate due to the ceramic ink. In addition, Chinese Patent Application No. 201880072438.7 and Chinese Patent Application No. 201880072380.6 disclose a laminated glass, which is formed by combining a plastic intermediate bonding layer with a basically opaque thin plastic or a thin film printed with a shield, thereby replacing the ceramic ink to play a shielding role. Moreover, Chinese Patent Application No. 201980000818.4 discloses a laminated glass panel. The laminated glass panel includes an opaque decoration generated by laminating a first decoration and a second decoration. The first decoration is on an intermediate bonding layer, the second decoration is on surface 2, surface 3, or surface 4 of the laminated glass panel, and the second decoration defines a free region (without glaze) having a size smaller than the first decoration. During assembly of the laminated glass panel, the first decoration is laminated on the second decoration. The first decoration may be formed on the intermediate bonding layer by screen printing, or may be formed by inserting a printing film of polyethylene terephthalate (PET) or a colored intermediate bonding film of PVB into the intermediate bonding layer. According to these technologies, a shield is printed on a surface of PVB or another opaque film is spliced with the surface of PVB as a shield, but bubbles and bubbles regenerated are easy to occur during subsequent vehicle glass production, and the shield is easy to be affected by a process of the vehicle glass production. Therefore, a processing quality is unstable, processing realization is complex, and blur, difficulty in controlling position accuracy, optical problems, etc., are easy to occur at a boundary between the shield and the glass substrate.

SUMMARY

In a first aspect, a laminated glass mounted with a camera is provide in the present disclosure. The laminated glass mounted with the camera includes an external glass panel, an internal glass panel, and an intermediate bonding layer. The external glass panel has a first surface facing an outside of a vehicle and a second surface facing an inside of the vehicle. The internal glass panel has a third surface facing the outside of the vehicle and a fourth surface facing the inside of the vehicle. The intermediate bonding layer is configured to bond the second surface and the third surface together. A bracket is fixed to the fourth surface. The bracket has at least one viewing window. The camera is mounted on the bracket. An opaque resin layer is further disposed between the fourth surface and the bracket. The opaque resin layer defines at least one optical transmitting window, and each of the at least one optical transmitting window corresponds to one of the at least one viewing window. The at least one optical transmitting window at least partially overlaps the at least one viewing window to make the camera collect an image through the at least one optical transmitting window and the at least one viewing window. The opaque resin layer has a visible light transmittance less than or equal to 3%. For each of the first surface, the second surface, the third surface, and the fourth surface, no dark ceramic ink layer is provided in a region which surrounds each of the at least one optical transmitting window and has a periphery at least 10 mm away from a periphery of said each of the at least one optical transmitting window.

In a second aspect, a laminated glass mounted with a camera is provided in the present disclosure. The laminated glass mounted with the camera includes an external glass panel, an internal glass panel, and an intermediate bonding layer. The external glass panel has a first surface facing an outside of a vehicle and a second surface facing an inside of the vehicle. The internal glass panel has a third surface facing the outside of the vehicle and a fourth surface facing the inside of the vehicle. The intermediate bonding layer is configured to bond the second surface and the third surface together. A bracket is fixed to the fourth surface. The bracket has at least one viewing window. The camera is mounted on the bracket. An opaque resin layer is further disposed between the fourth surface and the bracket. The opaque resin layer defines at least one optical transmitting window, and each of the at least one optical transmitting window corresponds to one of the at least one viewing window. The at least one optical transmitting window at least partially overlaps the at least one viewing window to make the camera collect an image through the at least one optical transmitting window and the at least one viewing window. The opaque resin layer has a visible light transmittance less than or equal to 3%. A first dark ceramic ink layer is disposed on the second surface and/or the fourth surface. A minimum distance between the first dark ceramic ink layer and a periphery of the at least one optical transmitting window is at least 10 mm.

DETAILED DESCRIPTION

Figure 1:
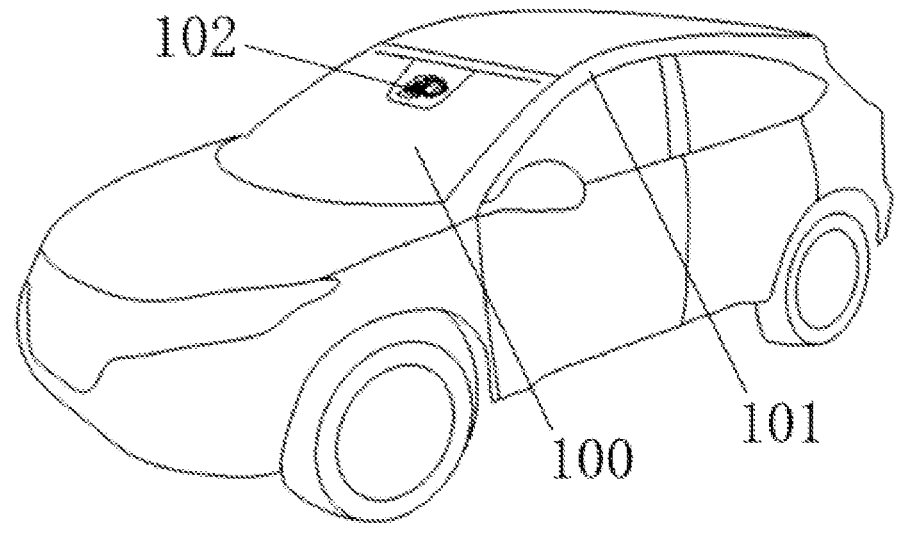
FIG. 1 is a schematic diagram illustrating assembly of a laminated glass mounted with a camera being mounted on a vehicle in the present disclosure.

A technical problem to be solved by the present disclosure is that in the related art, bubbles and bubbles regenerated are easy to occur, a processing quality is unstable, and blur, difficulty in controlling position accuracy, optical problems are easy to occur at a boundary, such that a laminated glass mounted with a camera is provided.

In a first aspect, a laminated glass mounted with a camera is provide in the present disclosure. The laminated glass mounted with the camera includes an external glass panel, an internal glass panel, and an intermediate bonding layer. The external glass panel has a first surface facing an outside of a vehicle and a second surface facing an inside of the vehicle. The internal glass panel has a third surface facing the outside of the vehicle and a fourth surface facing the inside of the vehicle. The intermediate bonding layer is configured to bond the second surface and the third surface together. A bracket is fixed to the fourth surface. The bracket has at least one viewing window. The camera is mounted on the bracket. An opaque resin layer is further disposed between the fourth surface and the bracket. The opaque resin layer defines at least one optical transmitting window, and each of the at least one optical transmitting window corresponds to one of the at least one viewing window. The at least one optical transmitting window at least partially overlaps the at least one viewing window to make the camera collect an image through the at least one optical transmitting window and the at least one viewing window. The opaque resin layer has a visible light transmittance less than or equal to 3%. For each of the first surface, the second surface, the third surface, and the fourth surface, no dark ceramic ink layer is provided in a region which surrounds each of the at least one optical transmitting window and has a periphery at least 10 mm away from a periphery of said each of the at least one optical transmitting window.

In implementations, the laminated glass has a diopter less than or equal to 200 mdpt at a region of the laminated glass corresponding to the at least one optical transmitting window defined by the opaque resin layer.

In implementations, for each of the first surface, the second surface, the third surface, and the fourth surface, no dark ceramic ink layer is provided in the region which surrounds said each of the least one optical transmitting window and has the periphery at least 50 mm away from the periphery of said each of the at least one optical transmitting window.

In implementations, the dark ceramic ink layer is disposed on the second surface and/or the fourth surface, and the dark ceramic ink layer has a visible light transmittance less than or equal to 1.5%.

In implementations, the dark ceramic ink layer is made of a black ceramic ink or a brown ceramic ink. The dark ceramic ink layer includes an organic solvent and an inorganic powder. A mass of the inorganic powder in the dark ceramic ink layer accounts for 70%-85%. The inorganic powder includes a glass glaze, a pigment, and an additive. The glass glaze has an average particle size of 5 μm-10 μm.

In implementations, at least one of the external glass panel or the internal glass panel is a bent glass panel formed by subjecting a flat glass panel to heat treatment of at least 560° C. and bending process. The dark ceramic ink layer is disposed on at least one surface of the flat glass panel.

In implementations, the dark ceramic ink layer includes a first dark ceramic ink layer located on a peripheral portion of the second surface and/or the fourth surface.

In implementations, the dark ceramic ink layer includes a second dark ceramic ink layer located on the fourth surface. The second dark ceramic ink layer has a visible light transmittance greater than or equal to the first dark ceramic ink layer.

In implementations, at least part of the second dark ceramic ink layer is located between the opaque resin layer and the fourth surface. At least part of the opaque resin layer is directly bonded to the fourth surface, and another part of the opaque resin layer is directly bonded to the second dark ceramic ink layer.

In implementations, at least part of a contour of said each of the at least one optical transmitting window is defined by the opaque resin layer. The contour of said each of the at least one optical transmitting window is 1-5 mm greater than a contour of a region of a field of view (FOV) of the camera on the fourth surface.

In implementations, the opaque resin layer further has an inclined portion extending into the at least one viewing window. A minimum distance between the inclined portion and a boundary of a FOV of the camera is at least 0.5 mm.

In implementations, the inclined portion is parallel or substantially parallel to the boundary of the FOV of the camera.

In implementations, the opaque resin layer is a resinous material with an opaque body or formed by disposing an opaque coating layer on at least one surface of a resinous material with a transparent body. The resinous material is made of at least one of styrene butadiene rubber (SBR), nitrile butadiene rubber (NBR), ethylene-propylene-diene monomer (EPDM), butyl rubber, polyethylene (PE), polypropylene (PP), polyvinyl chloride (PVC), polystyrene (PS), polymethylmethacrylate (PMMA), acrylonitrile butadiene styrene (ABS) plastic, polyamide (PA), polycarbonate (PC), polyoxymethylene (POM), polyethylene terephthalate (PET), polybutylene terephthalate (PBT), modified polyphenyleneoxide, fluoroplastic, polyimide (PI), polyphenylene sulfide (PPS), polysulfone (PSU) plastic, polyetheretherketone (PEEK), polyarylate (PAR), or poly-p-hydroxybenzoate (PHB).

In implementations, the bracket is a plastic bracket, and glass fibers or glass balls are added to the plastic bracket.

In implementations, a transparent conducting film is further disposed on at least one of the second surface, the third surface, or the fourth surface.

In implementations, the internal glass panel is a chemical tempered glass panel. The internal glass panel has a thickness less than or equal to 1.1 mm. The external glass panel has a thickness at least 0.7 mm greater than the internal glass panel.

In a second aspect, a laminated glass mounted with a camera is provided in the present disclosure. The laminated glass mounted with the camera includes an external glass panel, an internal glass panel, and an intermediate bonding layer. The external glass panel has a first surface facing an outside of a vehicle and a second surface facing an inside of the vehicle. The internal glass panel has a third surface facing the outside of the vehicle and a fourth surface facing the inside of the vehicle. The intermediate bonding layer is configured to bond the second surface and the third surface together. A bracket is fixed to the fourth surface. The bracket has at least one viewing window. The camera is mounted on the bracket. An opaque resin layer is further disposed between the fourth surface and the bracket. The opaque resin layer defines at least one optical transmitting window, and each of the at least one optical transmitting window corresponds to one of the at least one viewing window. The at least one optical transmitting window at least partially overlaps the at least one viewing window to make the camera collect an image through the at least one optical transmitting window and the at least one viewing window. The opaque resin layer has a visible light transmittance less than or equal to 3%. A first dark ceramic ink layer is disposed on the second surface and/or the fourth surface. A minimum distance between the first dark ceramic ink layer and a periphery of the at least one optical transmitting window is at least 10 mm.

In implementations, a second dark ceramic ink layer is further disposed on the fourth surface. A minimum distance between the second dark ceramic ink layer and the periphery of the at least one optical transmitting window is at least 10 mm.

In implementations, the second dark ceramic ink layer has a visible light transmittance greater than or equal to the first dark ceramic ink layer.

In implementations, at least part of the second dark ceramic ink layer is located between the opaque resin layer and the fourth surface. At least part of the opaque resin layer is directly bonded to the fourth surface, and another part of the opaque resin layer is directly bonded to the second dark ceramic ink layer; or all of the opaque resin layer is directly bonded to the fourth surface.

In implementations, the bracket is bonded to the opaque resin layer, or the bracket is fixed to the opaque resin layer through a fitting structure which is additionally disposed on the opaque resin layer and is able to be connected with the bracket.

By adopting the above technical solution, the present disclosure has following beneficial effects.

As for the laminated glass mounted with the camera in the present disclosure, a traditional dark ceramic ink layer located on a periphery portion of the at least one optical transmitting window is replaced by the opaque resin layer, such that no optical distortion or light distortion occurs on a region of the laminated glass corresponding to the FOV of the camera, an optical quality of a camera viewing region on the laminated glass is ensured, the diopter of the region of the laminated glass corresponding to the at least one optical transmitting window defined by the opaque resin layer is less than or equal to 200 mdpt, a region with a larger area and an excellent optical quality can be obtained, which is not only beneficial to the camera to collect the image, thereby making the image clearer and more recognizable and improving driving safety, but also beneficial to bonding and fixing of glass accessories such as a camera bracket, a rain sensor bracket, etc.

Contents of the present disclosure is further explained below in conjunction with accompanying draws.

As illustrated in FIG. 1, a laminated glass mounted with a camera 100 is fixed to an opening of a vehicle body 101 as a front windshield of a vehicle. At least one camera 102 is mounted on an upper part of the laminated glass 100 and on one side inside the vehicle. A light enters the at least one camera 102 through the laminated glass 100, and the at least one camera 102 is able to shoot a scene outside the vehicle into an image or record the scene outside the vehicle into a video, so as to record driving environment in front of the vehicle, or analyze and assist in changing driving behavior.

Figure 2:
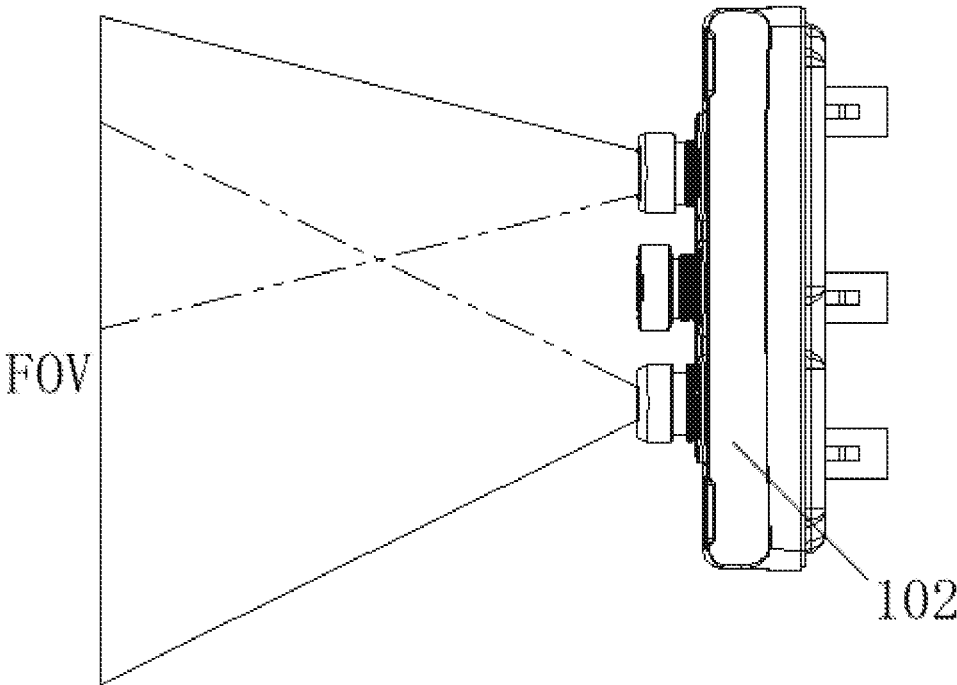
FIG. 2 is a schematic structural diagram of a camera in the present disclosure.

As illustrated in FIG. 2, a camera 102 is a device for collecting an image mainly by using optical principles, for example, a visible light and/or an infrared light is used for image formation. The camera 102 is mounted on the vehicle to realize functions such as lane departure warning (LDW), forward collision warning (FCW), traffic sign recognition (TSR), lane keeping assistance (LKA), pedestrian collision warning (PCW), night vision system (NVS), etc. The camera 102 has a field of view (FOV), which is used to represent the size of view of the camera 102. Since the camera 102 needs to collect the image through the laminated glass 100, a certain range of a light transmission region is needed in front of the view of the camera 102, and the FOV of the camera 102 defines a viewing region on the laminated glass 100. A trinocular camera is illustrated in FIG. 2. It can be understood that the camera 102 of the present disclosure may also be a monocular camera, a binocular camera, a multi-lens camera, etc., and the camera of the present disclosure may also be referred to as a video camera, an image camera, or the like.

Figures 3, 4:
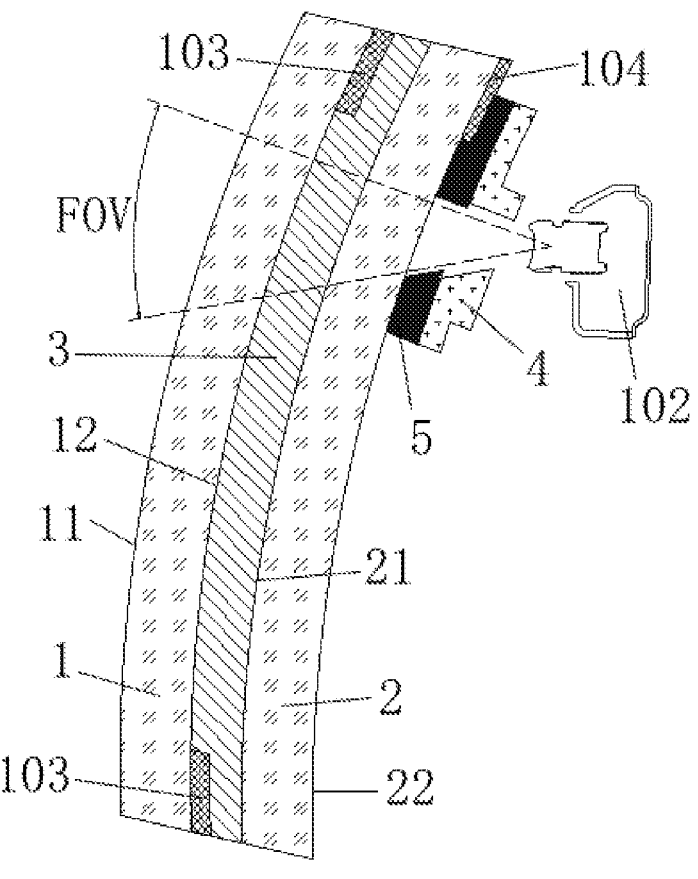
FIG. 3 is a schematic cross-sectional diagram of a laminated glass mounted with a camera in implementations of the present disclosure.
FIG. 4 is a partially enlarged diagram of FIG. 3.

As illustrated in FIG. 3 and FIG. 4, the laminated glass 100 includes an external glass panel 1, an internal glass panel 2, and an intermediate bonding layer 3. The external glass panel 1 has a first surface 11 facing an outside of a vehicle and a second surface 12 facing an inside of the vehicle. The internal glass panel 2 has a third surface 21 facing the outside of the vehicle and a fourth surface 22 facing the inside of the vehicle. The intermediate bonding layer 3 is configured to bond the second surface 12 and the third surface 21 together. A bracket 4 is fixed to the fourth surface 22. The bracket 4 has at least one viewing window 41. The camera 102 is mounted on the bracket 4. An opaque resin layer 5 is further disposed between the fourth surface 22 and the bracket 4. The opaque resin layer 5 defines at least one optical transmitting window 51, and each of the at least one optical transmitting window 51 corresponds to one of the at least one viewing window 41. The at least one optical transmitting window 51 at least partially overlaps the at least one viewing window 41 to make the camera 102 collect an image through the at least one optical transmitting window 51 and the at least one viewing window 41. Specifically, one optical transmitting window 51 at least partially overlaps one viewing window 41 to make the camera 102 collet the image through the optical transmitting window 51 and the viewing window 41. The opaque resin layer 5 has a visible light transmittance less than or equal to 3%. For each of the first surface 11, the second surface 12, the third surface 21, and the fourth surface 22, no dark ceramic ink layer is provided in a region which surrounds each of the at least one optical transmitting window 51 and has a periphery at least 10 mm (e.g., 15 mm, or 25 mm) away from a periphery of said each of the at least one optical transmitting window 51. Specifically, the region is ring-shaped, an internal periphery of the region is the periphery of said each of the at least one optical transmitting window 51, and an external periphery of the region is at least 10 mm away from the internal periphery. In this way, a traditional dark ceramic ink layer located on a periphery portion of the at least one optical transmitting window 51 is replaced by the opaque resin layer 5, such that no optical distortion or light distortion occurs on a region of the laminated glass 100 corresponding to the FOV of the camera 102, and an optical quality of a camera viewing region on the laminated glass 100 is ensured, the diopter of the region of the laminated glass 100 corresponding to the at least one optical transmitting window 51 defined by the opaque resin layer 5 is less than or equal to 200 mdpt. In implementations, the diopter is less than or equal to 100 mdpt. In implementations, the diopter is less than or equal to 75 mdpt, or even less than or equal to 50 mpdt. A region with a larger area and an excellent optical quality can be obtained, which is not only beneficial to the camera 102 to collect the image, thereby making an image clearer and more recognizable and improving driving safety, but also beneficial to bonding and fixing of glass accessories such as a camera bracket, a rain sensor bracket, etc. The diopter is a result of measuring optical distortion of the laminated glass 100 in an inclined posture at a mounted angle according to a Moire-Fringe method. In implementations, for each of the first surface 11, the second surface 12, the third surface 21, and the fourth surface 22, no dark ceramic ink layer is provided in the region which surrounds said each of the at least one optical transmitting window 51 and has the periphery at least 30 mm away from the peripheral of said each of the at least one optical transmitting window 51. In implementations, for each of the first surface 11, the second surface 12, the third surface 21, and the fourth surface 22, no dark ceramic ink layer is provided in the region which surrounds said each of the at least one optical transmitting window 51 and has the periphery at least 50 mm away from the peripheral of said each of the at least one optical transmitting window 51.

In the present disclosure, the dark ceramic ink layer may also be disposed on the second surface 12 and/or the fourth surface 22, and the dark ceramic ink layer is configured to improve appearance, protect accessories inside the vehicle, and improve a local bonding property. In implementations, the dark ceramic ink layer has a visual light transmittance less than or equal to 1.5% and an ultraviolet transmittance less than or equal to 0.05%. Specifically, for example, in the present disclosure, a first dark ceramic ink layer 103 is disposed on a peripheral portion of the second surface 12 and/or the fourth surface 22, and/or a second dark ceramic ink layer 104 is further disposed on the fourth surface 22.

Figure 5:
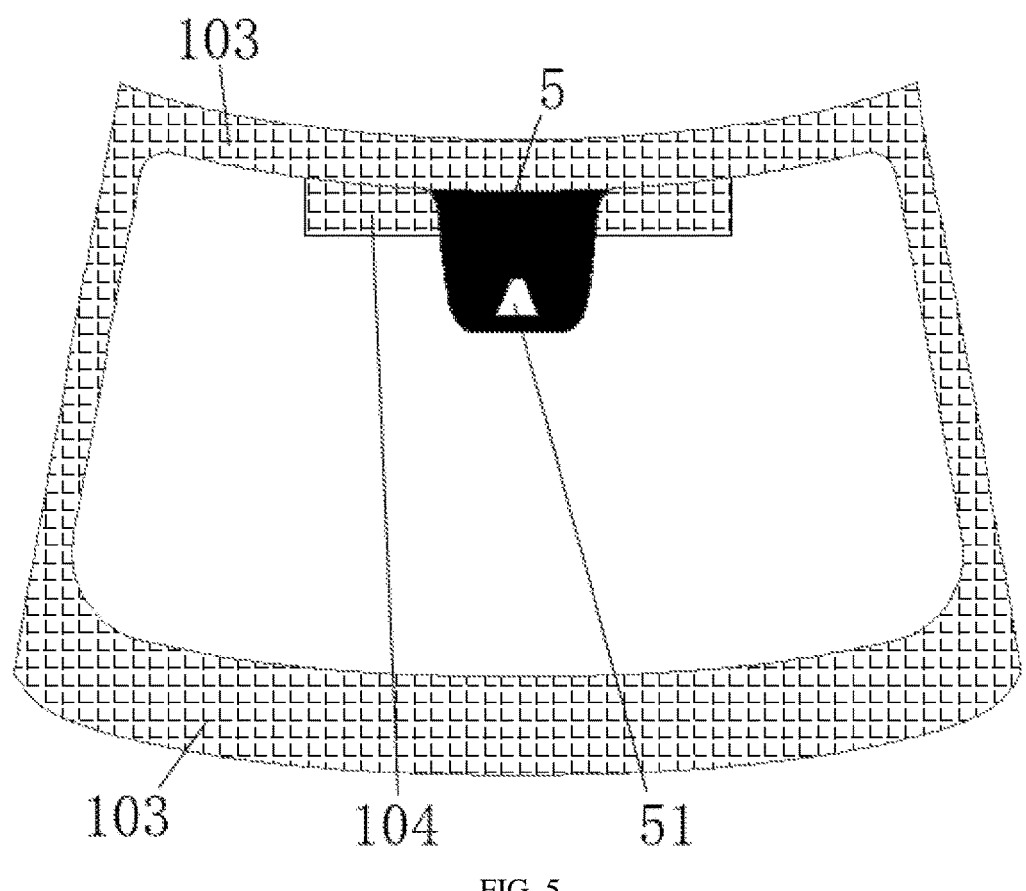
FIG. 5 is a top schematic diagram of a laminated glass mounted with a camera in the present disclosure.

As illustrated in FIG. 3, FIG. 4, and FIG. 5, the first dark ceramic ink layer 103 is disposed at the peripheral portion of the second surface 12 and/or the fourth surface 22. A minimum distance between the first dark ceramic ink layer 103 and the periphery of the at least one optical transmitting window 51 is at least 10 mm. The first dark ceramic ink layer 103 is configured to shield the accessories inside the vehicle, which can ensure coordination of peripheral colors of the laminated glass 100, improve peripheral appearance, block solar radiation, avoid aging of the accessories inside the vehicle, and improve stability and service life of the product.

In FIG. 3, FIG. 4, and FIG. 5, a second dark ceramic ink layer 104 is further disposed on the fourth surface 22, and the second dark ceramic ink layer 104 functions as a transition between the at least one optical transmitting window 51 and the first dark ceramic ink layer 103, which protect the accessories inside the vehicle, and improve the local bonding property. At least part of the second dark ceramic ink layer 104 is located between the opaque resin layer 5 and the fourth surface 22, and a minimum distance between the second dark ceramic ink layer 104 and the peripheral of the at least one optical transmitting window 51 is at least 10 mm, such that at least part of the opaque ceramic ink layer 5 is directly bonded to the fourth surface 22, and the other part of the opaque resin layer 5 is directly bonded to the second dark ceramic ink layer 104. In implementations, the second dark ceramic ink layer 104 has a visible light transmittance equal to the first dark ceramic ink layer 103. In implementations, the second dark ceramic ink layer 104 has the visible light transmittance greater than the first dark ceramic ink layer 103.

In the meanwhile, no second dark ceramic ink layer 104 may be disposed between the opaque resin layer 5 and the fourth surface 22, for example, such that a non-ink region with a larger area can exist on the fourth surface 22, and all the opaque resin layer 5 can be directly bonded to the non-ink region of the fourth surface 22.

The dark ceramic ink layer can be formed on a surface of a flat glass panel by planographic printing, etc., and after the dark ceramic ink layer and the flat glass panel are subjected to heat treatment of at least 560° C. and bending process together, the dark ceramic ink layer is sintered on a surface of a bent glass panel. In implementations, the dark ceramic ink layer is made of a black ceramic ink or a brown ceramic ink, and can be formed by screen printing, inkjet printing, etc. The dark ceramic layer usually includes an organic solvent and an inorganic power, and a mass of the inorganic power in the dark ceramic ink layer accounts for 70%-85%. The inorganic power mainly includes a glass glaze, a pigment, and an additive. The glass glaze has an average particle size of 5 μm-10 μm, main components of the glass glaze are bismuth borosilicate, zinc borosilicate, etc., and the glass glaze is used to determine a sintering temperature range and chemical resistance of the dark ceramic ink layer. Main components of the pigment are iron oxide, copper oxide, cobalt oxide, nickel oxide, manganese oxide, etc., and the pigment plays a role in shielding and providing color.

Figure 6:
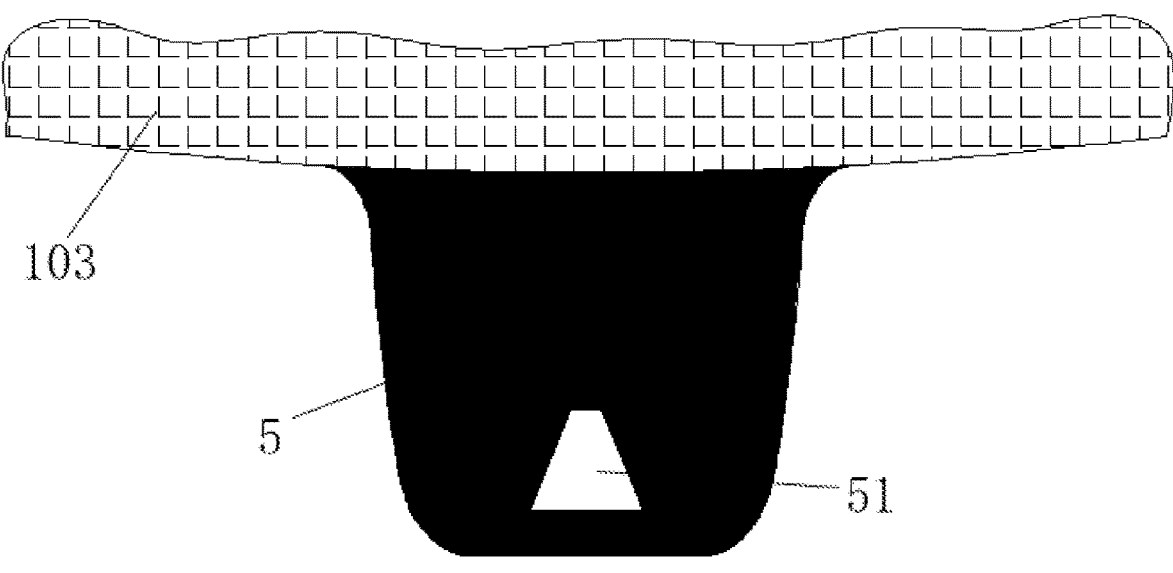
FIG. 6 is a partially enlarged diagram of FIG. 5.
Figures 7, 8:
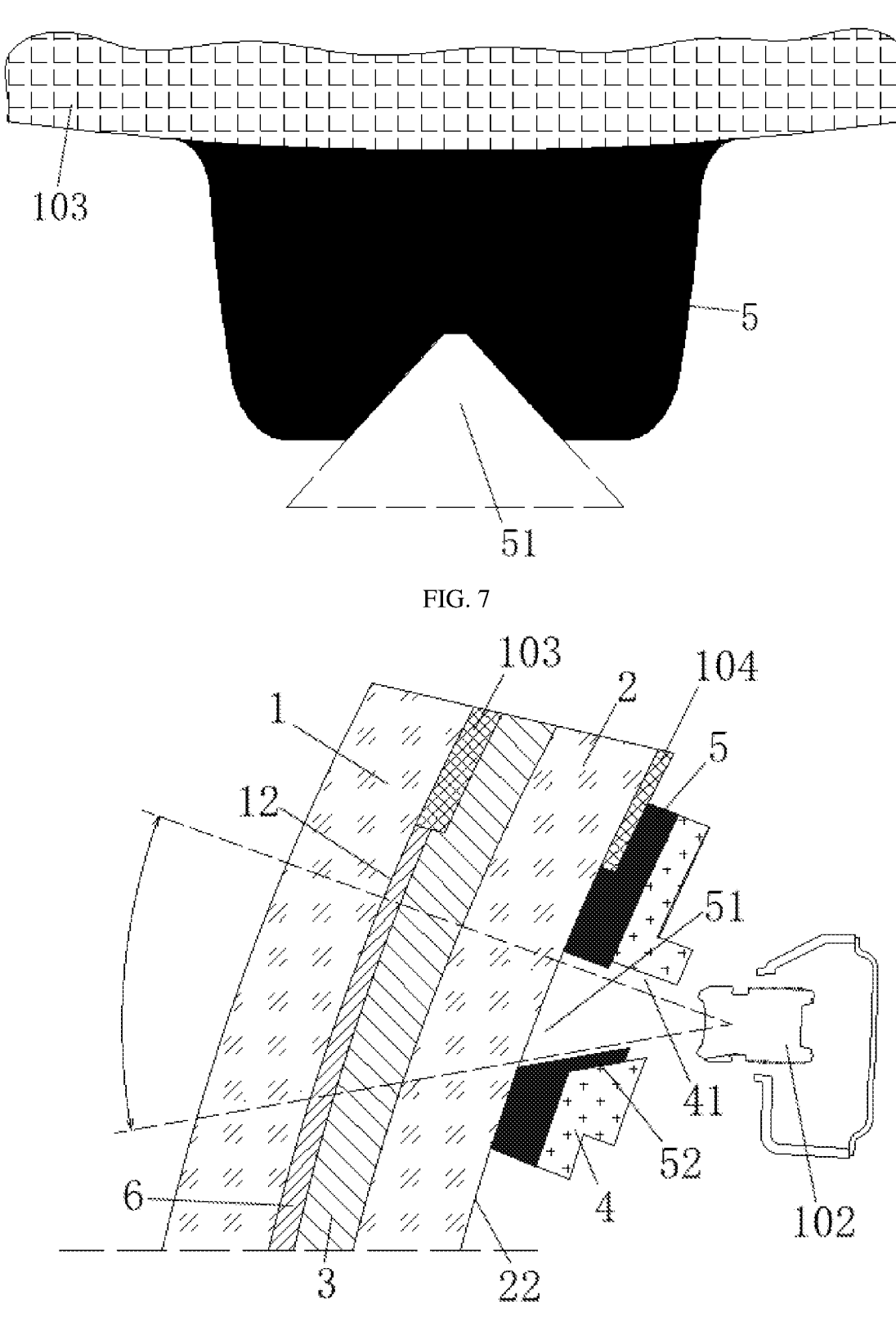
FIG. 7 is an enlarged schematic diagram of an optical transmitting window in other implementations of the present disclosure.
FIG. 8 is a schematic cross-sectional diagram of a laminated glass mounted with a camera in other implementations of the present disclosure.

As illustrated in FIG. 6 and FIG. 7, the opaque resin layer 5 has a top edge adjacent to the first dark ceramic ink layer 103, the opaque resin layer 5 defines an optical transmitting window 51, and at least part of a contour of the optical transmitting window 51 is defined by the opaque resin layer 5. In FIG. 6, the optical transmitting window 51 is located within the opaque resin layer 5, that is, an entire contour of the optical transmitting window 51 is defined by the opaque resin layer 5. In FIG. 7, the optical transmitting window 51 is close to an edge portion of the opaque resin layer 5 and a notch is defined an edge of the opaque resin layer 5, that is, part of contour of the optical transmitting window 51 is defined by the opaque resin layer 5. When the camera 102 collects the image through the optical transmitting window 51 and the viewing window 41, areas of the optical transmitting window 51 and the viewing window 41 need to be slightly larger than an area corresponding to the FOV of the camera 102, which cannot only avoid an insufficient FOV region due to an insufficient light transmission area, but also avoid a poor image quality caused by excessive stray lights outside the vehicle entering the camera 102 due to an excessive light transmission area. In implementations, the contour of the optical transmitting window 51 is 1-5 mm greater than a contour of a region of the FOV of the camera 102 on the fourth surface 22.

As illustrated in FIG. 8, the opaque resin layer 5 further has an inclined portion 52 extending into the at least one viewing window 41, and a minimum distance between the inclined portion 52 and a boundary of the FOV of the camera 102 is at least 0.5 mm, such as 1 mm, 2 mm, 3.5 mm, etc. Therefore, entry of external stray lights into the camera 102 is further reduced, an influence of the external stray lights on the image collected by the camera 102 is minimized, and a quality of the image collected by the camera 102 is improved. In implementations, the inclined portion 52 is parallel or substantially parallel to the boundary of the FOV of the camera 102, which facilitates data processing of the image collected by the camera 102.

In the present disclosure, the opaque resin layer 5 may be a resinous material with an opaque body or formed by disposing an opaque coating on at least one surface of a resinous material with a transparent body, and the resinous material is made of at least one of styrene butadiene rubber (SBR), nitrile butadiene rubber (NBR), ethylene-propylene-diene monomer (EPDM), butyl rubber, polyethylene (PE), polypropylene (PP), polyvinyl chloride (PVC), polystyrene (PS), polymethylmethacrylate (PMMA), acrylonitrile butadiene styrene (ABS) plastic, polyamide (PA), polycarbonate (PC), polyoxymethylene (POM), polyethylene terephthalate (PET), polybutylene terephthalate (PBT), modified polyphenyleneoxide, fluoroplastic, polyimide (PI), polyphenylene sulfide (PPS), polysulfone (PSU) plastic, polyetheretherketone (PEEK), polyarylate (PAR), or poly-p-hydroxybenzoate (PHB). In implementations, the opaque resin layer 5 is made of a soft resinous material, such as a resinous material with Shore hardness of 65-80, such as a foamed ethylene propylene diene monomer (EPDM) material with a density of 0.6. The opaque resin layer 5 can be bonded to the bracket 4 through an acrylic foam tape (e.g., brand: 3M GT7104 #), or the opaque resin layer 5 can be fixed to the bracket 4 through a fitting structure, where the fitting structure is additionally disposed on the opaque resin layer 5 and able to be connected with the bracket 4. In implementations, the resinous material with the opaque body is a black resinous material, and the opaque coating is a black ink, where the "opaque" means that the visual light transmittance is less than or equal to 3%, and the "transparent" means that the visual light transmittance is greater than or equal to 70%.

The bracket 4 is a plastic bracket, such as a bracket of black polybutylene terephthalate (PBT) with 15% glass balls or a bracket of PBT with 20% glass fibers. The bracket 4 is bonded to the opaque resin layer 5, and at least one of the second dark ceramic ink layer 104 or the fourth surface 22 through polyurethane (PU) glue (i.e., Sika Tack-Ultrafast) and undercoat (i.e., Sika Primer 206G+P), such that the camera 102 is fixed to the inside of the laminated glass 100. In implementations, glass fibers or a glass balls are also added to the plastic bracket, such that the bracket 4 has an expansion characteristic or an expansion coefficient similar as the laminated glass 100. When a temperature of the laminated glass 100 or a temperature inside the vehicle is high, the bracket 4 expands substantially synchronously with the laminated glass 100, thereby keeping reliable positioning of the camera 102 and ensuring the quality of the image collected by the camera 102.

In FIG. 8, a transparent conducting film 6 is further disposed on the second surface 12, and the transparent conducting film 6 is configured to reflect infrared lights and/or electrically heat. The transparent conducting film 6 can be directly deposited onto the second surface 12 by chemical vapor deposition (CVD) or physical vapor deposition (PVD), such as by magnetron sputtering deposition. In addition, in implementations, the transparent conducting film 6 can withstand heat treatment of high temperature, such as a heat treatment process of a bending process such as hot bending, tempering, etc. Specifically, the transparent conducting film 6 may include a metal layer, a metal alloy layer, or a metal oxide layer. The metal layer may be made of gold (Au), silver (Ag), copper (Cu), aluminum (Al), or molybdenum (Mo), the metal alloy layer may be made of silver alloy, and the metal oxide layer may be made of indium tin oxide (ITO), fluorine-doped tin dioxide (FTO), aluminum-doped zinc dioxide (AZO), antimony-doped tin oxide (ATO), etc. For example, when the transparent conducting film 6 includes a silver layer or a silver alloy layer, the silver layer or the silver alloy layer is located between at least two medium layers, and the at least two medium layers include at least one of zinc oxide, tin oxide, indium oxide, titanium oxide, silicon oxide, aluminium oxide, silicon nitride, silicon carbide, aluminum nitride, or a titanium metal layer. At least one film-removing window (not illustrated) corresponding to the at least one optical transmitting window 51 can further be defined in the transparent conducting film 6, and the transparent conducting film 6 is at least partially removed in the film-removing window, so as to facilitate transmission of an electromagnetic wave signal and ensure a spectral property of the laminated glass 100. The transparent conducting film 6 can also be disposed on the three surface 21 and/or the fourth surface 22 according to design.

In the present disclosure, at least one of the external glass panel 1 or the internal glass panel 2 is a bent glass panel formed by subjecting a flat glass panel to heat treatment of at least 560° C. and bending process. The heat treatment of at least 560° C. and the bending process are production processes of vehicle glass, such as the hot bending, physical tempering, or other bending processes. In implementations, the internal glass panel 2 is a chemical tempered glass panel, the internal glass panel 2 has a thickness less than or equal to 1.1 mm, and the external glass panel 1 has a thickness at least 0.7 mm greater than the internal glass panel 2. As for the chemical tempering, ions with different ionic radii are exchanged on a surface of a thin glass or an ultra-thin glass, such that a relatively high surface stress is generated on the surface of the thin glass or the ultra-thin glass, accompanied by a certain depth of stress layer, thereby improving a strength of the thin glass or the ultra-thin glass in terms of mechanical properties. In implementations, the internal glass panel 2 is an alkaline aluminosilicate glass.

The intermediate bonding layer 3 of the present disclosure is configured to bond and fix the external glass panel 1 and the internal glass panel 2 together. For example, the intermediate bonding layer 3 may be made of PC, PVC, PVB, ethylene vinyl acetate (EVA), polyacrylate (PA), PMMA, or polyurethane (PUR). The intermediate bonding layer 3 can also have other functions. For example, at least one colored region is disposed as a shadow band to reduce an interference of sunlight on human eyes, or an infrared absorbent is added to have sunscreen or heat insulation function. For another example, the intermediate bonding layer 3 may also include at least two layers, one of which has a higher content of a plasticizer to have a sound insulation function, or one of which has a wedge shape to have a head-up display (HUD) function, etc.

The laminated glass mounted with the camera in the present disclosure is described in detail above, but the present disclosure is not limited by the content of specific implementations described above, so any improvement, equivalent modification, and replacement made according to technical points of the present disclosure are within the scope of protection of the present disclosure.

What is claimed is:

1. A laminated glass mounted with a camera, comprising an external glass panel, an internal glass panel, and an intermediate bonding layer, wherein the external glass panel has a first surface facing an outside of a vehicle and a second surface facing an inside of the vehicle, the internal glass panel has a third surface facing the outside of the vehicle and a fourth surface facing the inside of the vehicle, the intermediate bonding layer is configured to bond the second surface and the third surface together;

a bracket is fixed to the fourth surface, the bracket has at least one viewing window, and the camera is mounted on the bracket;

an opaque resin layer is further disposed between the fourth surface and the bracket, the opaque resin layer defines at least one optical transmitting window, each of the at least one optical transmitting window corresponds to one of the at least one viewing window, the at least one optical transmitting window at least partially overlaps the at least one viewing window to make the camera collect an image through the at least one optical transmitting window and the at least one viewing window, the opaque resin layer has a visible light transmittance less than or equal to 3%, and for each of the first surface, the second surface, the third surface, and the fourth surface, no dark ceramic ink layer is provided in a region which surrounds each of the at least one optical transmitting window and has a periphery at least 10 mm away from a periphery of said each of the at least one optical transmitting window;

the opaque resin layer further has an inclined portion extending, in a thickness direction of the laminated glass, into the at least one viewing window, and a minimum distance between the inclined portion and a boundary of a field of view (FOV) of the camera is at least 0.5 mm;

a dark ceramic ink layer is provided on the second surface and/or the fourth surface;

the dark ceramic ink layer comprises a first dark ceramic ink layer located on a peripheral portion of the second surface and/or the fourth surface;

the dark ceramic ink layer comprises a second dark ceramic ink layer located on the fourth surface, and the second dark ceramic ink layer has a visible light transmittance greater than the first dark ceramic ink layer; and the second dark ceramic ink layer functions as a transition between the at least one optional transmitting window and the first dark ceramic ink layer.

2. The laminated glass of claim 1, wherein the laminated glass has a diopter less than or equal to 200 mdpt at a region of the laminated glass corresponding to the at least one optical transmitting window defined by the opaque resin layer.

3. The laminated glass of claim 1, wherein for each of the first surface, the second surface, the third surface, and the fourth surface, no dark ceramic ink layer is provided in the region which surrounds said each of the at least one optical transmitting window and has the periphery at least 50 mm away from the periphery of said each of the at least one optical transmitting window.

4. The laminated glass of claim 1, wherein the dark ceramic ink layer has a visible light transmittance less than or equal to 1.5%.

5. The laminated glass of claim 4, wherein the dark ceramic ink layer is made of a black ceramic ink or a brown ceramic ink, the dark ceramic ink layer comprises an organic solvent and an inorganic powder, a mass of the inorganic powder in the dark ceramic ink layer accounts for 70%-85%, the inorganic powder comprises a glass glaze, a pigment, and an additive, and the glass glaze has an average particle size of 5 μm-10 μm.

6. The laminated glass of claim 4, wherein at least one of the external glass panel or the internal glass panel is a bent glass panel formed by subjecting a flat glass panel to heat treatment of at least 560° C. and bending process, and the dark ceramic ink layer is disposed on at least one surface of the flat glass panel.

7. The laminated glass of claim 1, wherein at least part of the second dark ceramic ink layer is located between the opaque resin layer and the fourth surface, at least part of the opaque resin layer is directly bonded to the fourth surface, and another part of the opaque resin layer is directly bonded to the second dark ceramic ink layer.

8. The laminated glass of claim 1, wherein at least part of a contour of said each of the at least one optical transmitting window is defined by the opaque resin layer, and all of the contour of said each of the at least one optical transmitting window is 1-5 mm greater than a contour of a region of a FOV of the camera on the fourth surface.

9. The laminated glass of claim 1, wherein the inclined portion is parallel or substantially parallel to the boundary of the FOV of the camera.

10. The laminated glass of claim 1, wherein the opaque resin layer is a resinous material with an opaque body or formed by disposing an opaque coating layer on at least one surface of a resinous material with a transparent body, and the resinous material is made of at least one of styrene butadiene rubber (SBR), nitrile butadiene rubber (NBR), ethylene-propylene-diene monomer (EPDM), butyl rubber, polyethylene (PE), polypropylene (PP), polyvinyl chloride (PVC), polystyrene (PS), polymethylmethacrylate (PMMA), acrylonitrile butadiene styrene (ABS) plastic, polyamide (PA), polycarbonate (PC), polyoxymethylene (POM), polyethylene terephthalate (PET), polybutylene terephthalate (PBT), modified polyphenyleneoxide, fluoroplastic, polyimide (PI), polyphenylene sulfide (PPS), polysulfone (PSU) plastic, polyetheretherketone (PEEK), polyarylate (PAR), or poly-p-hydroxybenzoate (PHB).

11. The laminated glass of claim 1, wherein the bracket is a plastic bracket, and glass fibers or glass balls are added to the plastic bracket.

12. The laminated glass of claim 1, wherein a transparent conducting film is further disposed on at least one of the second surface, the third surface, or the fourth surface.

13. The laminated glass of claim 1, wherein the internal glass panel is a chemical tempered glass panel, the internal glass panel has a thickness less than or equal to 1.1 mm, and the external glass panel has a thickness at least 0.7 mm greater than the internal glass panel.

14. A laminated glass mounted with a camera, comprising an external glass panel, an internal glass panel, and an intermediate bonding layer, wherein the external glass panel has a first surface facing an outside of a vehicle and a second surface facing an inside of the vehicle, the internal glass panel has a third surface facing the outside of the vehicle and a fourth surface facing the inside of the vehicle, the intermediate bonding layer is configured to bond the second surface and the third surface together;

a bracket is fixed to the fourth surface, the bracket has at least one viewing window, and the camera is mounted on the bracket;

an opaque resin layer is further disposed between the fourth surface and the bracket, the opaque resin layer defines at least one optical transmitting window, each of the at least one optical transmitting window corresponds to one of the at least one viewing window, the at least one optical transmitting window at least partially overlaps the at least one viewing window to make the camera collect an image through the at least one optical transmitting window and the at least one viewing window, the opaque resin layer has a visible light transmittance less than or equal to 3%, a first dark ceramic ink layer is disposed on a peripheral portion of the second surface and/or the fourth surface, and a minimum distance between the first dark ceramic ink layer and a periphery of the at least one optical transmitting window is at least 10 mm;

the opaque resin layer further has an inclined portion extending, in a thickness direction of the laminated glass, into the at least one viewing window, and a minimum distance between the inclined portion and a boundary of a field of view (FOV) of the camera is at least 0.5 mm;

a second dark ceramic ink layer is further provided on the fourth surface, and the second dark ceramic ink layer has a visible light transmittance greater than the first dark ceramic ink layer; and the second dark ceramic ink layer functions as a transition between the at least one optional transmitting window and the first dark ceramic ink layer.

15. The laminated glass of claim 14, wherein a minimum distance between the second dark ceramic ink layer and the periphery of the at least one optical transmitting window is at least 10 mm.

16. The laminated glass of claim 15, wherein at least part of the second dark ceramic ink layer is located between the opaque resin layer and the fourth surface, at least part of the opaque resin layer is directly bonded to the fourth surface, and another part of the opaque resin layer is directly bonded to the second dark ceramic ink layer; or all of the opaque resin layer is directly bonded to the fourth surface.

17. The laminated glass of claim 14, wherein the bracket is bonded to the opaque resin layer; or the bracket is fixed to the opaque resin layer through a fitting structure which is additionally disposed on the opaque resin layer and is able to be connected with the bracket.

\* \* \* \* \*